(12) United States Patent
Risse et al.

(10) Patent No.: US 10,722,813 B2
(45) Date of Patent: Jul. 28, 2020

(54) PREPARATION OF NANOPARTICLES BY FLASH EVAPORATION

(71) Applicants: Centre National De La Recherche Scientifique (C.N.R.S), Paris (FR); ISL—Institut franco-allemand de recherches de Saint-Louis, Saint-Louis (FR)

(72) Inventors: Benedikt Risse, Schallstadt (DE); Dominique Hassler, Bartenheim (FR); Denis Spitzer, Oberschaeffolsheim (FR)

(73) Assignees: ISL—INSTITUT FRANCO-ALLEMAND DE RECHERCHES DE SAINT-LOUIS, Paris (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 263 days.

(21) Appl. No.: 14/377,161

(22) PCT Filed: Feb. 7, 2013

(86) PCT No.: PCT/EP2013/052478
§ 371 (c)(1),
(2) Date: Aug. 6, 2014

(87) PCT Pub. No.: WO2013/117671
PCT Pub. Date: Aug. 15, 2013

(65) Prior Publication Data
US 2015/0000846 A1      Jan. 1, 2015

(30) Foreign Application Priority Data

Feb. 7, 2012   (FR) ...................... 12 51143

(51) Int. Cl.
*B01D 9/00*        (2006.01)
*B01D 1/18*        (2006.01)
(Continued)

(52) U.S. Cl.
CPC ............. *B01D 9/0027* (2013.01); *B01D 1/18* (2013.01); *B01D 9/0022* (2013.01); *B01J 2/04* (2013.01);
(Continued)

(58) Field of Classification Search
CPC .......... B01D 9/0027; B01D 1/18; B01D 1/16; F26B 3/12
(Continued)

(56) References Cited

U.S. PATENT DOCUMENTS 7,628,893 B1 * 12/2009 Bonser ..................... B01D 1/18
159/2.1
2002/0009494 A1 * 1/2002 Curatolo ................ A61K 9/146
424/489

(Continued)

FOREIGN PATENT DOCUMENTS

WO   WO 2006/101352 A1   9/2006
WO   WO 2007/028421 A1   3/2007
(Continued)

OTHER PUBLICATIONS

Trullinger, C. "Controlling atomization in your spray dryer" (1996), pp. 1-3.*
(Continued)

*Primary Examiner* — Philip Y Louie
(74) *Attorney, Agent, or Firm* — Knobbe, Martens, Olson & Bear, LLP

(57) ABSTRACT

A method of preparing organic or inorganic nanoparticles is useful in the manufacture of of fertilizers, pharmaceutical or phytopharmaceutical active ingredients, or insensitive
(Continued)

energy materials. The method includes preparing a solution of a compound in a solvent, heating the solution under a pressure ranging from 3 to 300 bars at a temperature higher than the boiling point of the solvent, atomizing the solution in an spray drying chamber using at least one dispersion device and at an angle ranging from 30 to 150° under pressure ranging from 0.0001 to 2 bars, separating the solvent in gaseous form, and recovering the nanoparticles.

26 Claims, 2 Drawing Sheets

(51) Int. Cl.
  *B01J 2/04* (2006.01)
  *B04C 9/00* (2006.01)
(52) U.S. Cl.
  CPC ........ *B04C 9/00* (2013.01); *B01D 2009/0086* (2013.01); *B04C 2009/001* (2013.01)
(58) Field of Classification Search
  USPC ................. 159/3, 48.1; 34/287, 289, 372
  See application file for complete search history.

(56) References Cited

U.S. PATENT DOCUMENTS

| | | | |
|---|---|---|---|
| 2006/0210640 A1* | 9/2006 | Kerkhof | A61K 9/1623 424/489 |
| 2008/0213375 A1* | 9/2008 | Ray | A61K 9/1694 424/489 |
| 2009/0197085 A1* | 8/2009 | Coppa | A61K 9/14 428/402 |
| 2010/0316696 A1* | 12/2010 | Wiggenhorn | A61K 9/1277 424/450 |
| 2013/0165371 A1* | 6/2013 | Dobry | B01J 2/04 514/5.9 |

FOREIGN PATENT DOCUMENTS

| WO | WO 2009105792 A1 * | 8/2009 | ......... A61K 9/5123 |
|---|---|---|---|
| WO | WO 2012/014923 A1 | 2/2012 | |

OTHER PUBLICATIONS

"Hollow Cone Nozzles" (2010).*
Kumar et al., "Nanoparticle stability: Processing pathways for solvent removal", Chemical Engineering Science 64 (2009) p. 1358-1361. (Year: 2009).*

* cited by examiner

PREPARATION OF NANOPARTICLES BY FLASH EVAPORATION

FIELD OF THE INVENTION

The invention relates to the field of nanoparticle preparation. In particular the invention provides a method for preparing organic or inorganic nanoparticles by instantaneous evaporation or flash evaporation, for example to produce nanoparticles of fertilizers, pharmaceutical or phytopharmaceutical active ingredients or insensitive energetic materials.

The method of the invention comprises the heating of a solution of an organic or inorganic compound at a temperature higher than the boiling point of the solvent at standard pressure, whilst avoiding evaporation of this solvent through the action of strong pressure on the solution. Atomization of the solution after it has passed through a nozzle causes expansion and evaporation of the solvent in an extremely short time, generally in the order of a fraction of a second. Evaporation of the solvent causes extreme supersaturation of the droplets and the compound crystallizes to form nanoparticles. The nanoparticles can then be separated e.g. in an electrostatic precipitation device or using an axial flow cyclone, these devices possibly being associated. Separation is generally conducted at reduced pressure.

One of the advantages of the method of the invention is that it allows control over the size of the nanoparticles, in particular by acting on pressure, temperature, solvent, concentration or type of nozzle used.

BACKGROUND OF THE INVENTION

There are existing methods to prepare nanoparticles of compounds.

Nonetheless these known methods do not always allow particle sizes to be reached which are truly of submicron size.

Other known methods do not allow the preparation of large quantities of nanoparticles within reasonable time. The known methods often have reduced production capacities, in particular on account of the difficulties encountered when recovering the particles. Therefore, different methods are known to prepare nanoparticles in a supercritical fluid, applied for example to derivatives of carotenoids (DE-2943267) and to protein derivatives (WO-2006/101352) or for the depositing of nanometric film (U.S. Pat. Nos. 4,734,451, 4,970,093). These documents describe RESS technology (Rapid Expansion of Supercritical Solutions) which is only efficient on a reduced scale and cannot therefore be transferred onto industrial level.

Another method describes the preparation of nano- and microparticles, applied to lipid compounds through the successive use of two supercritical fluids (WO-2007/028421). The first fluid is used to prepare a solution containing these lipid derivatives and the second fluid allows the dispersing of this solution. This method describes the obtaining of nano- and microparticles by modifying the solubility of the lipid composition in the two supercritical fluids.

One of the disadvantages of the methods using supercritical fluids is that they are limited by the solubility of the composition in these supercritical fluids.

In addition, these prior art methods do not allow the preparation of composite nanoparticles with a determined ratio of the composite elements. In fact, the ratio of the composite elements in the initial solution does not correspond to the ratio of the elements of the targeted composite. This difference between the initial ratio and the final ratio of the composite elements results from the respective solubility of the composite elements in the initial solution used and treated with the supercritical fluid.

Also, these methods cannot be universally applied irrespective of the nature of the composition.

The preparation of nanoparticles by misting is also known with the use of transducers (FR-2897281).

Finally, a semi-continuous nanoparticle trapping method is known to purify water and integrates an evaporation step (U.S. Pat. No. 7,628,893).

SUMMARY OF THE INVENTION

There is therefore a need for a method to prepare nanoparticles which provides solutions to the problems of known methods. The invention concerns a method for preparing nanoparticles which brings a solution to all or part of the problems of known methods.

In particular, the method of the invention is easier to implement since it uses a solution and not a compressed gas and the pressures to be reached are lower than for methods in a supercritical medium.

In addition, the method of the invention allows the preparation of nanoparticles of very small size in large quantities, these being dispersed and do not aggregate.

In a particularly advantageous manner, the method of the invention can be carried out on an industrial scale.

The invention therefore provides a method for preparing nanoparticles of at least one compound, at least one dimension of the nanoparticles being smaller than 100 nm, comprising the successive steps of:
- preparing a solution comprising at least one organic or mineral compound and at least one solvent;
- heating the solution under pressure ranging from 3 to 300 bars, at a temperature higher than the boiling point of the solvent or at a temperature higher than the boiling point of the solvent mixture;
- atomizing the solution in an spray drying chamber using at least one dispersing device and at an angle ranging from 30 to 150° at a pressure ranging from 0.0001 to 2 bars;
- separating the solvent in gaseous form.

DETAILED DESCRIPTION OF THE PREFERRED EMBODIMENT

Figure 1:
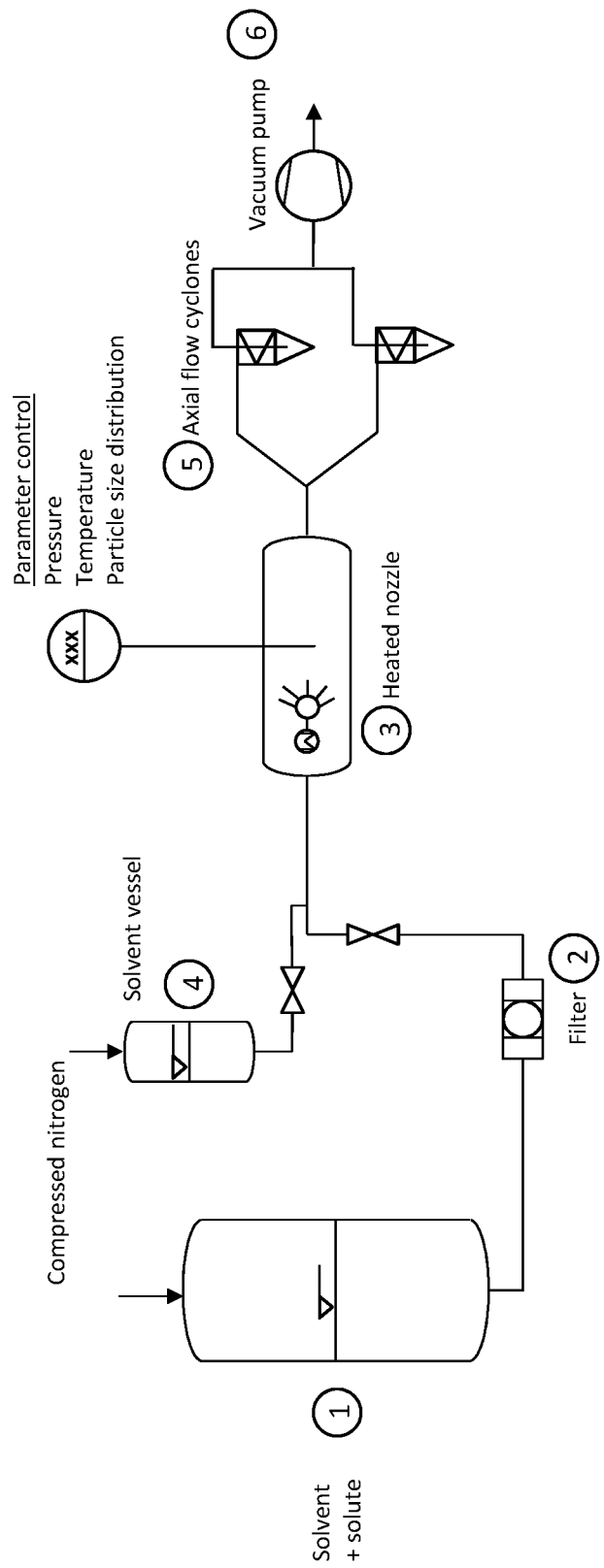
FIG. 1. A device for preparing nanoparticles.

The size of the compound nanoparticles prepared according to the invention is submicron for at least one of the dimensions of these particles, preferably the size of the prepared nanoparticles ranges from 2 to 100 nm, more preferably from 5 to 90 nm or 10 to 80 nm.

The method of the invention is suitable for preparing nanoparticles of numerous organic or inorganic compounds. In particular, the method of the invention is particularly efficient and advantageous for preparing nanoparticles of energetic compounds, pharmaceutical compounds, phytopharmaceutical compounds, dye compounds, pigments, inks, paints and metal oxides.

Numerous solutions comprising at least one organic or mineral compound are suitable for the method of the invention.

In a particularly advantageous manner, the organic or mineral compound is selected from among compounds soluble in solvents whose boiling point is lower than 80° C.

The method of the invention can be applied for continuous or semi-continuous preparation of nanoparticles.

Advantageously, the method of the invention comprises a final step to recover the nanoparticles of compounds. This recovery can be performed using one or more devices selected from among an electrostatic separator, a cyclone separator, a cyclone separator comprising an electrostatic device.

To increase the rate of evaporation and hence the degree of saturation, the heating of the solution is performed before atomization.

In the method of the invention, heating is conducted above the boiling point of the solvent and allows a strong increase in the solubility of the compound in the chosen solvent. Within the superheated solution, the vaporisation heat is stored in the form of thermal energy.

With the method of the invention, it is possible to cause the level of vaporized solvent to vary according to the degree of superheating applied to the solution.

Numerous solvents are suitable for the method of the invention. They can be used alone or in a mixture.

The preferred solvents have the following properties:
low boiling point;
low enthalpy of vaporization;
high specific heat.

Among the solvents used for the method of the invention, preference is given to solvents whose boiling point is lower than 80° C., even lower than 60° C.

As examples of solvents suitable for the method of the invention, alkanes can be cited e.g. pentane (bp=36° C.) or hexane (bp=68° C.); alcohols e.g. methanol (bp=65° C.) or ethanol (bp=78-79° C.); thiols e.g. ethane-thiol (bp=35° C.); aldehydes e.g. ethanal (bp=20° C.) or propionic aldehyde (bp=48° C.); ketones e.g. acetone (bp=56° C.); ethers e.g. methyl-tert-butyl ether (bp=55° C.) or tetrahydrofuran (bp=66° C.); acid esters, in particular the esters of formic acid e.g. methyl formiate (bp=32° C.), the esters of acetic acid e.g. methyl acetate (bp=57-58° C.); amines e.g. trimethylamine (bp=2-3° C.).

To prevent the solvent from evaporating too rapidly when heating the solution, strong overpressure in relation to atmospheric pressure is applied to the solution. The heating of the solution is thus advantageously conducted at a pressure ranging from 5 to 150 bars, preferably at a pressure ranging from 10 to 60 bars.

Advantageously, the pressure applied to the solution when heating is applied under the pressure of an inert gas, in particular an inert gas selected from among nitrogen, argon, helium, neon, xenon. Nitrogen is preferred The reducing of overpressure causes instantaneous evaporation of the solvent at a flash evaporation step in a fraction of a second. This flash evaporation leads to such supersaturation that the compound dissolved in the solvent crystallizes immediately.

This crystallization is therefore initiated at the time the solution is atomized in the spray drying chamber. This atomization of the solution is advantageously performed at a pressure ranging from 0.001 to 2 bars.

Preferably, atomization is conducted using a dispersion device selected from among a hollow cone nozzle, solid cone nozzle, flat jet nozzle, rectilinear jet nozzle, a pneumatic atomizer and the associations thereof. The preferred device is a hollow cone nozzle.

The method of the invention is suitable for atomizing the solution in a spray drying chamber using a dispersion device. Atomization is performed using a number of dispersion devices totaling between 1 and 100, advantageously between 1 and 50, more advantageously between 3 and 5.

In particularly advantageous manner, notably on an industrial scale, the method of the invention can be implemented by atomizing the solution in a spray drying chamber using a number of dispersion devices totaling 100 or more.

Also preferably, atomization is implemented at an angle of 60 to 80°.

After atomizing the solution, the separating of the nanoparticles from the gas phase is advantageously carried out in an electrostatic precipitator, in an axial cyclone separator or in a combination of an electrostatic precipitator and an axial cyclone separator.

The electrostatic precipitator is operated at atmospheric pressure whilst the axial cyclone is operated at a pressure lower than atmospheric pressure.

In particularly advantageous manner, the combination of two axial cyclone separators in parallel allows the semi-continuous production of nanoparticles.

One example of an electrostatic precipitator suitable for the method of the invention is described in FR-2897281 (page 4) and comprises a cylindrical device having a central electrode and a peripheral metal electrode. The central electrode is a wire of small diameter and the peripheral electrode is a copper electrode. The difference in potential between the two electrodes is between 5 and 20 kV for a distance of about 4 to 5 cm.

One example of an axial cyclone separator suitable for the method of the invention is described in U.S. Pat. No. 6,969,420, in particular in embodiments 1 and 2 of the examples.

Said device allows the separation of nanoparticles as a function of their dynamic diameter further to the circular movement imparted to the particles inside the cyclone. The particles are finally collected in a vessel or filter-holder cassette.

The solvent in gaseous state is removed for example by means of a vacuum pump. It can then be collected or recycled.

In addition to a method for preparing nanoparticles, the invention concerns a device allowing the implementation of this method. The invention therefore provides a device for crystallizing the nanoparticles of at least one compound, comprising:
  a reactor comprising:
    a feed of a solution of the compound and at least one solvent;
    a pressurizing device up to 3 to 300 bars;
    a heating device;
  a spray drying chamber comprising:
    at least one device for dispersing the solution at an angle ranging from 30 to 150° and at a pressure ranging from 0.0001 to 2 bars;
    a solvent separating device;
  one or more devices to recover the compound nanoparticles selected from among an electrostatic separator, a cyclone, a cyclone comprising an electrostatic device.

One embodiment of the device of the invention is illustrated in FIG. 1.

The device is composed of four main parts: a vessel (1) for storing the solution of solvent and precursor under high pressure, a spray drying chamber comprising an integrated heated nozzle (3), two axial cyclones (5) mounted in parallel and allowing semi-continuous production, a vacuum pump (6).

In the vessel (1) containing the solvent with the solute an overpressure of compressed nitrogen is applied. Initially this overpressure allows displacement of the oxygen and prevents evaporation of the solvent. The volume flow rate in this system is induced by the overpressure of compressed nitrogen.

A 15 μm filter (2) repels all the solid impurities in the initial solution.

A nozzle (3) with hollow cone and electric heating is installed in the spray drying chamber. The parameters of pressure, temperature and particle size distribution are controlled. The type of connection allows rapid changing of nozzles. The electric heating temperature is chosen by the user.

A solvent reservoir or vessel (4) is filled with the same solvent as the vessel (1) and is used to rinse the line and nozzle after use.

The axial flow cyclones (5) are installed in parallel. When in service only one cyclone is operative; the second cyclone is in idle mode. By means of centrifugal force the solid particles are deposited inside the cyclone, the gaseous components leave the cyclone via a suction tube. To drain the cyclone first the circuit leading to the second cyclone is opened and the first circuit leading to the first cyclone is then closed.

The vacuum pump (6) ensures permanent flow in the installation and allows the extraction of solvent vapours from the system.

The preparation of nanoparticles according to the invention is described below in particular embodiments using the following examples.

Example 1: Preparation of Nanoparticles of Bis-5-Nitrotetrazolato Tetra-Amine Cobalt Perchlorate (BNCP)

The device in FIG. 1 was used.

4.3 g of BNCP (bis-5-nitrotetrazolato tetra-amine cobalt perchlorate) were dissolved in 2300 mL of acetone. The solution was heated to 160° C. under a pressure of 20 to 25 bars. Using a nozzle with hollow cone the solution was dispersed in a spray drying chamber at an atomizing angle of 60°. The pressure in the spray drying chamber was 5 mbar. Particle separation was performed using an axial flow cyclone. The spray drying chamber and axial flow cyclone were heated externally to 100° C.

2.3 g of BNCP nanoparticles were obtained.

Figure 2:
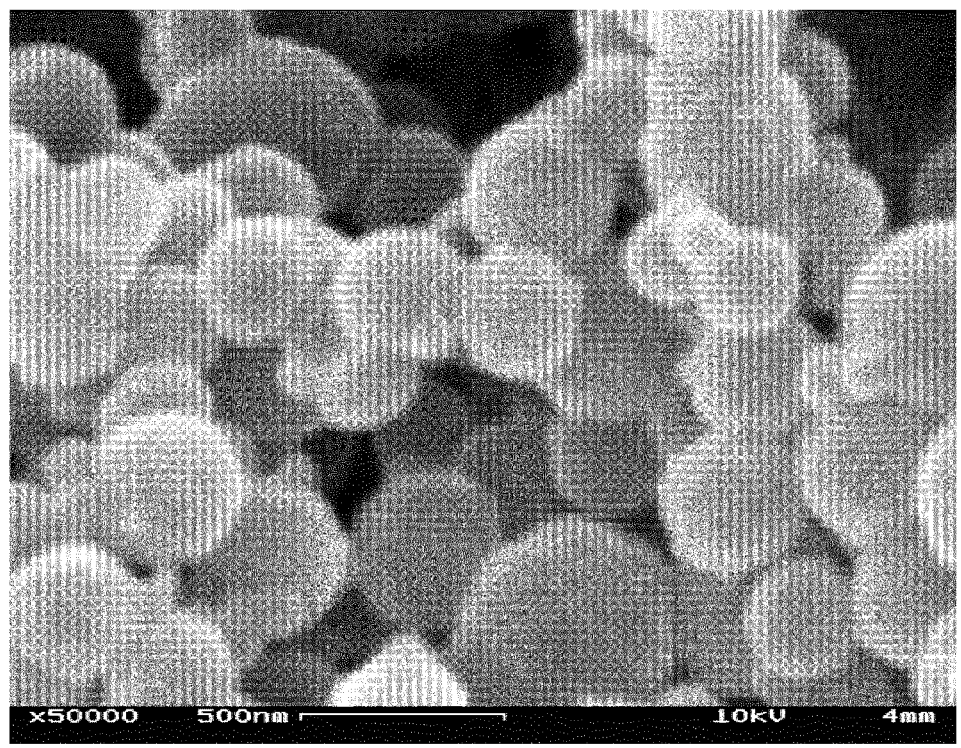
FIG. 2. BNCP (bis-5-nitrotetrazolato tetra-amine cobalt perchlorate) particles produced have a spherical shape. The mean size evaluated by image analysis under Scanning Electron Microscope (SEM) is 300±200 nm.

The BNCP particles produced have a spherical shape. The mean size evaluated by image analysis under Scanning Electron Microscope (SEM) is 300±200 nm (FIG. 2).

In addition, nanocrystallization results in BNCP desensitization. Compared with the initial product the nanocrystallization of BNCP allows 400% desensitization to friction and 65 desensitization to electrostatic discharge (ESD) (see Table 1). The sensitivity to friction was measured using the BAM method (Bundesanstalt für Materialprüfung) and friction testing apparatus of "Julius Peters" type. Sensitivity to electrostatic discharge was measured using a spark sensitivity tester; model ESD 2008, OZM Research s.r.o.

TABLE 1

| | Impact (J) | Friction (N) | ESD (mJ) |
|---|---|---|---|
| BNCP yellow | 1.56 | 20 | 120.74 |
| BNCP yellow & nanocrystallized | <1.56 | 84 | 199.59 |

Example 2: Preparation of a Composite of Nanoparticles of Cyclotrimethylenetrinitramine (RDX) and Trinitrotoluene (TNT)

The device in FIG. 1 was used.

1.2 g of RDX (cyclotrimethylenetrinitramine) and 0.8 g of TNT (trinitrotoluene) were dissolved in 500 mL of acetone. The solution was heated to 150° C. under a pressure of 25 bars. Using a nozzle with hollow cone the solution was dispersed in a spray drying chamber at an atomization angle of 60°. The pressure in the spray drying chamber was 5 mbar. Particle separation was performed using two axial flow cyclones in parallel.

After one hour, 0.75 g of composite RDX-TNT nanoparticles were obtained. The mean size evaluated by image analysis was between 200 nm and 500 nm.

The invention claimed is:

1. A method for preparing solid crystalline nanoparticles of at least one compound, by flash evaporation, at least one dimension of the solid crystalline nanoparticles being smaller than 1000 nm, the method comprising the successive steps of:
   preparing a solution comprising at least one organic or mineral compound and at least one solvent;
   heating the solution under a high pressure ranging from 3 to 300 bar at a temperature higher than the boiling point of the at least one solvent at atmospheric pressure, while avoiding evaporation of the at least one solvent through an action of said high pressure on the solution;
   atomizing the solution in a spray drying chamber using at least one dispersion device and at an angle ranging from 30 to 150° under a reduced pressure ranging from 0.0001 to 2 bar, wherein the reduction of pressure from the high pressure to the reduced pressure causes instantaneous evaporation of the at least one solvent by a flash evaporation, thereby providing immediate crystallization of said at least one organic or mineral compound in the form of solid crystalline nanoparticles, at least one dimension of said solid crystalline nanoparticles being smaller than 1000 nm;
   separating the at least one solvent in gaseous form from said solid crystalline nanoparticles in a separation device, said at least one solvent being removed by vacuum pump; and
   recovering said solid crystalline nanoparticles.

2. The method according to claim 1, wherein said separation device is selected from the group consisting of an electrostatic separator, a cyclone, and a cyclone comprising an electrostatic device.

3. The method according to claim 1, wherein the method is continuous or semi-continuous.

4. The method according to claim 1, wherein the boiling point of the at least one solvent is lower than 80° C.

5. The method according to claim 4, wherein the boiling point of the at least one solvent is lower than 60° C.

6. The method according to claim 1, wherein the heating of the solution is performed under a high pressure ranging from 5 to 150 bar.

7. The method according to claim 6, wherein the heating of the solution is performed under a high pressure ranging from 10 to 60 bar.

8. The method according to claim 1, wherein the heating of the solution is performed under a high pressure of an inert gas selected from the group consisting of nitrogen, argon, helium, neon, and xenon.

9. The method according to claim 1, wherein the dispersion device is selected from the group consisting of a hollow cone nozzle, a solid cone nozzle, a flat jet nozzle, a rectilinear jet nozzle, a pneumatic atomizer, and a combination thereof.

10. The method according to claim 9, wherein the dispersion device is a hollow cone nozzle.

11. The method according to claim 1, wherein the atomization is performed at an angle of 60 to 80°.

12. The method according to claim 1, wherein the at least one organic or mineral compound is selected from the group consisting of energetic compounds, pharmaceutical compounds, phytopharmaceutical compounds, dye compounds, pigments, inks, paints, and metal oxides.

13. The method according to claim 1, wherein the at least one solvent is selected from the group consisting of an alkane, an alcohol, a thiol, an aldehyde, a ketone, an ether, an acid ester, and an amine.

14. The method according to claim 1, wherein the at least one dimension of the nanoparticles ranges from 2 to 100 nm.

15. The method according to claim 1, wherein the at least one dimension of the nanoparticles ranges from 5 to 90 nm.

16. The method according to claim 1, wherein the at least one dimension of the nanoparticles ranges from 10 to 80 nm.

17. The method of claim 13, wherein the at least one solvent is an alkane selected from the group consisting of pentane (bp=36° C.) and hexane (bp=68° C.).

18. The method of claim 13, wherein the at least one solvent is an alcohol selected from the group consisting of methanol (bp=65° C.) and ethanol (bp=78-79° C.).

19. The method of claim 13, wherein the at least one solvent is ethane-thiol (bp=35° C.).

20. The method of claim 13, wherein the at least one solvent is an aldehyde selected from the group consisting of ethanal (bp=20° C.) and propionic aldehyde (bp=48° C.).

21. The method of claim 13, wherein the at least one solvent is acetone (bp=56° C.).

22. The method of claim 13, wherein the at least one solvent is an ether selected from the group consisting of methyl-tert-butyl ether (bp=55° C.) and tetrahydrofuran (bp=66° C.).

23. The method of claim 13, wherein the at least one solvent is an acid ester selected from the group consisting of a formic acid ester and an ester of acetic acid.

24. The method of claim 23, wherein the solvent is methyl formiate (bp=32° C.).

25. The method of claim 23, wherein the at least one solvent is methyl acetate (bp=57-58° C.).

26. The method of claim 13, wherein the at least one solvent is trimethylamine (BP=2-3° C.).

* * * * *

UNITED STATES PATENT AND TRADEMARK OFFICE
CERTIFICATE OF CORRECTION

PATENT NO. : 10,722,813 B2  
APPLICATION NO. : 14/377161  
DATED : July 28, 2020  
INVENTOR(S) : Benedikt Risse et al.

Page 1 of 1

It is certified that error appears in the above-identified patent and that said Letters Patent is hereby corrected as shown below:

On the Title Page

In Column 2, item (57), Abstract, Line 2, delete "of of" and insert --of--.

In the Specification

In Column 3, Line 43, delete "formiate" and insert --formate--.

In Column 5, Line 62, delete "65" and insert --65%--.

In the Claims

In Column 8, Line 24, Claim 24, delete "formiate" and insert --formate--.

In Column 8, Line 28, Claim 26, delete "(BP" and insert --(bp--.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*